United States Patent [19]
Banks, Sr.

[11] Patent Number: 5,590,925
[45] Date of Patent: Jan. 7, 1997

[54] UTILITY FIXTURE FOR A TRUCK

[76] Inventor: Matthew J. Banks, Sr., 354 Plank Rd., Averil Park, N.Y. 12108

[21] Appl. No.: 410,223

[22] Filed: Mar. 24, 1995

[51] Int. Cl.$^6$ ............................................. B62D 33/04
[52] U.S. Cl. ........................................ 296/24.1; 296/183
[58] Field of Search .............................. 296/24.1, 37.6, 296/181, 183

[56] References Cited

U.S. PATENT DOCUMENTS

| | | | |
|---|---|---|---|
| 1,886,782 | 11/1932 | Bentz | 296/24.1 |
| 2,530,578 | 11/1950 | Hotop | 296/24.1 |
| 3,068,038 | 12/1962 | Douglass, Jr. | 296/24.1 |
| 3,326,595 | 6/1967 | Ogilvie | 296/37.6 |
| 4,103,956 | 8/1978 | Faulstich | 296/24.1 X |
| 4,844,305 | 7/1989 | McKneely | 296/37.6 X |
| 5,102,180 | 4/1992 | Finley | 296/37.6 |

Primary Examiner—Andrew C. Pike
Attorney, Agent, or Firm—Schmeiser, Olsen & Watts

[57] ABSTRACT

A utility body for a truck includes two top-located compartments and one bottom-located compartment. Each of the top-located compartments has an access door that is guided by a track system so that it can be moved completely within the top of the compartment when it is in its fully open position. The bottom-located compartment underlies both top-located compartments and can be used to store objects that are long and/or wide.

3 Claims, 4 Drawing Sheets

UTILITY FIXTURE FOR A TRUCK

FIELD OF THE INVENTION

The invention is in the field of vehicular components. More particularly, the invention is a utility fixture designed to rest atop the rear portion of a truck. The of the fixture includes a plurality of separated compartments located at different vertically disposed locations. Swinging doors are used to provide access to each compartment.

BACKGROUND OF THE INVENTION

Many businesses, tradesmen, and public service units employ trucks that feature a plurality of storage compartments that are accessible from outside of the vehicle. These typically side-located compartments provide enclosed storage space for tools, spare parts, and other needed equipment. The doors that provide access to the compartments are normally attached to the body by hinges that allow their associated door to swing either to the side or in an upwards or downwards direction. A compartment door will usually also include a lockable latch mechanism that allows the door to be locked or otherwise secured when access to the compartment is not required.

There are a number of problems with the compartmented utility fixtures that are in common use. First, the compartments are often too small to enable storage of long and/or wide items such as eight foot lengths of wood or pipe or a five-foot by eight-foot sheet of plywood. This forces the vehicle operator to place such items on racks located atop or on the sides of the vehicle. In these locations, the items may be stolen when the vehicle is parked or become dislodged during transit.

A second problem with prior art compartmented truck fixtures is that the outwardly swinging doors obstruct access to nearby compartments and severely restrict clearance around the sides of the vehicle. In addition, a compartment door that swings upwardly and has one end secured to the top of the fixture may not provide sufficient clearance for tall individuals.

A third problem is that the design of the compartments usually does not provide a user with easy accessibility to the interior of the compartments. For example, when a utility fixture body has side compartments that extend up to the top of the body, a user often cannot reach and/or see items that are located near the top of the compartment. As a result, upper areas of a tall compartment may not be utilized to the maximum extent possible.

SUMMARY OF THE INVENTION

The invention is a multi-compartmented utility fixture designed to fit atop a rear portion of a truck chassis. The body of the fixture includes two upper compartments and one lower compartment that completely underlies the upper compartments.

The upper compartments extend the length of the body and each makes use of one-half the width of the body. Access to the compartments is provided via side-located doors that swing upwards and into the body when they are opened. In this manner, the doors do not obstruct access to adjacent compartments or impede movement proximate the vehicle when they are in an open condition. Located within each of the upper compartments is a raised shelf. Removable tables may be placed on sides of the utility body for use with a table saw and an aluminum brake.

The lower compartment extends the full length and width of the body. Access to this compartment is achieved via a door located at the rear of the body. The door is designed to swing downwardly when in an open condition to thereby facilitate access to the compartment.

DETAILED DESCRIPTION OF THE DRAWINGS

Figure 1:
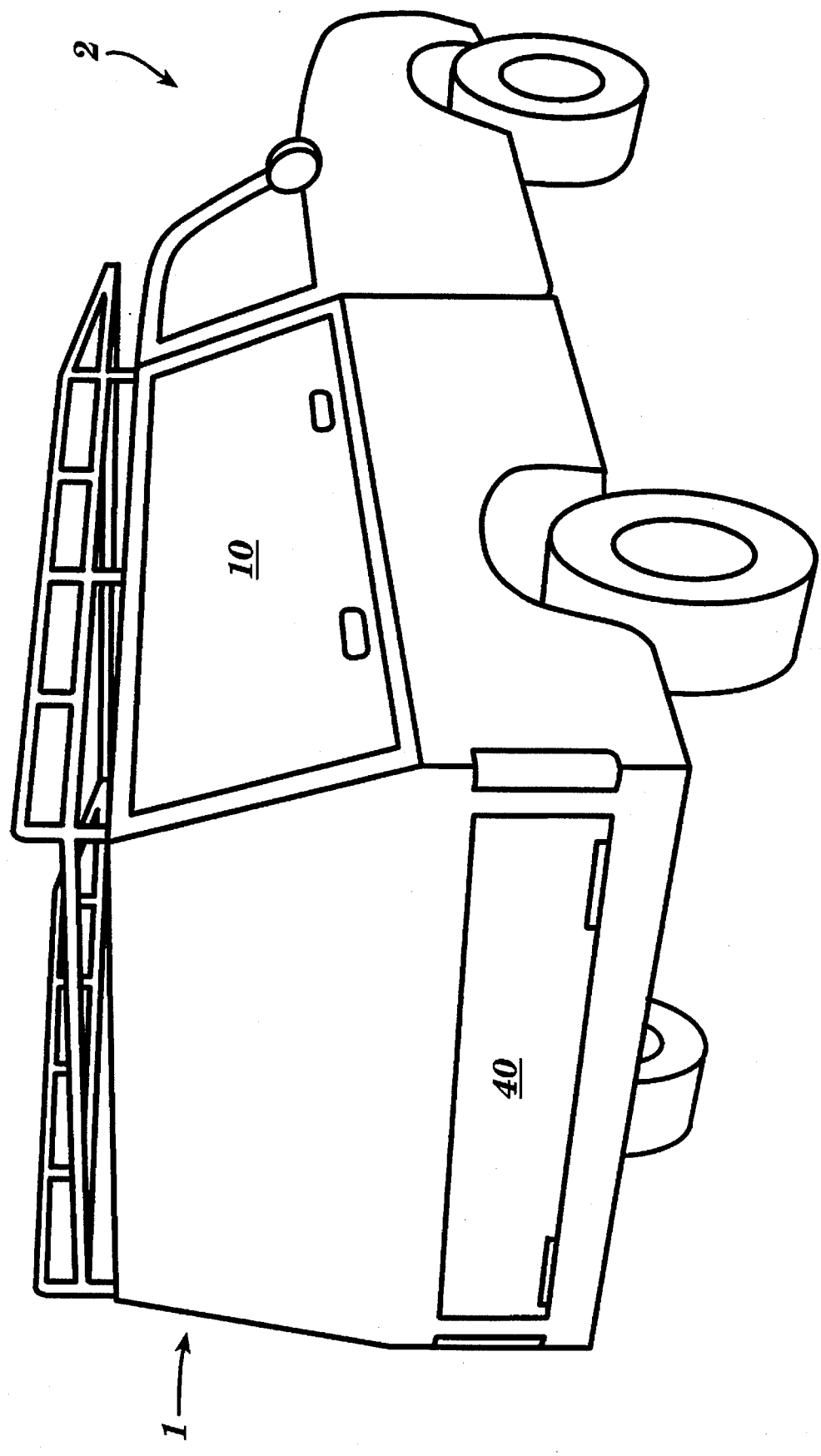
FIG. 1 is a perspective side view of a truck that incorporates a utility fixture in accordance with the invention.

Referring now to the drawings in greater detail, wherein like reference characters refer to like parts throughout the several figures, there is shown by the numeral 1 a utility fixture in accordance with the invention. The body of the utility fixture is shown mounted atop the rear portion of a chassis of a truck 2.

The body is preferably made of a rigid material such as metal or fiberglass. The body includes a top portion that has two substantially identical compartments 4 and 6. A bottom portion of the body contains a single compartment 8.

Each of the two top-located compartments 4 and 6 is accessible from exterior to the body via a side-located moveable door, 10 and 12 respectively. As shown, each of the compartments 4 and 6 extends the entire length of the body and has a width approximately equal to one-half the width of the body. A divider 14 separates the two compartments.

In the preferred embodiment, each of the compartments 4 and 6 has a fixed shelf 16. The shelf is secured to the divider and rests atop a support leg 18.

Figure 2:
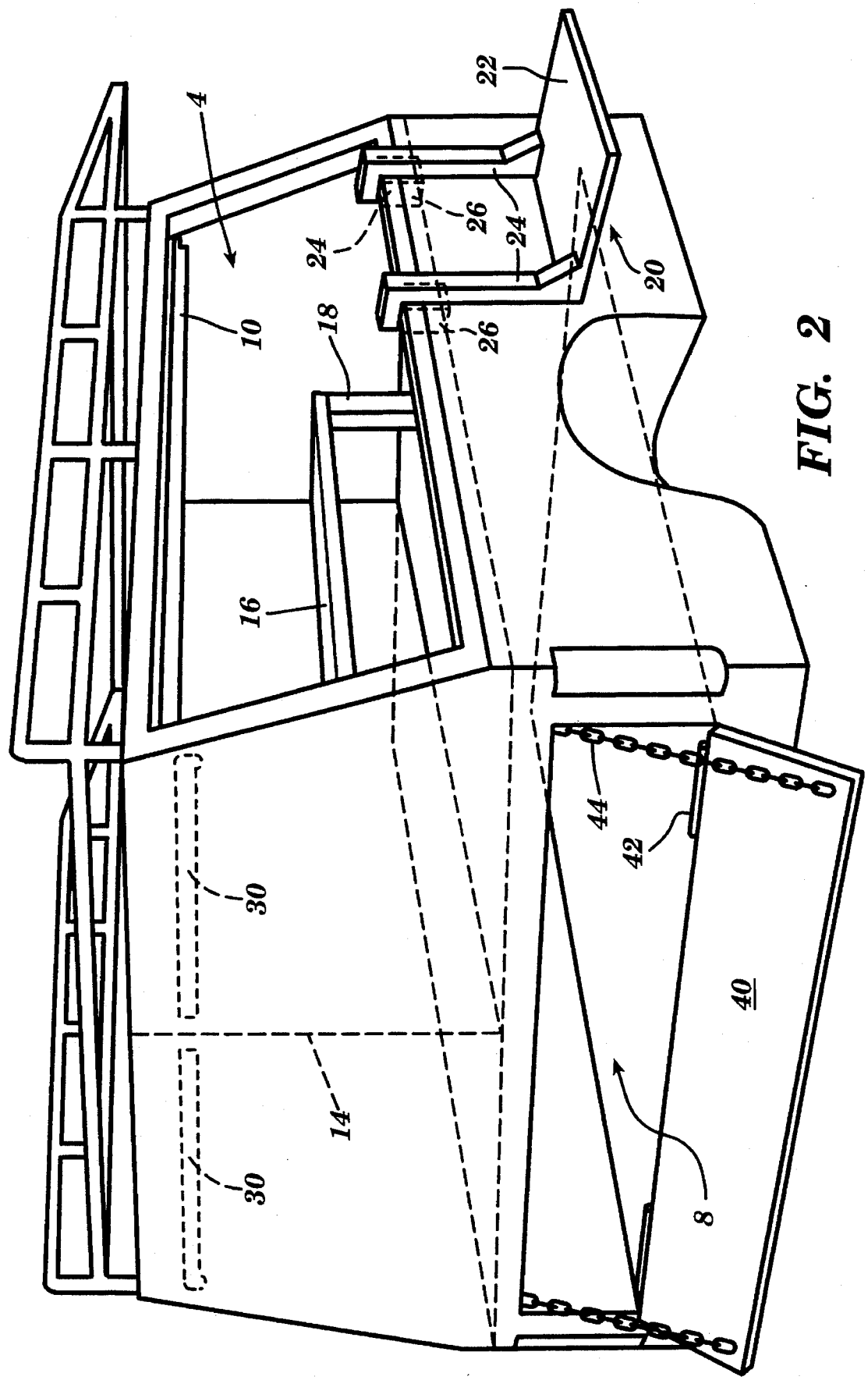
FIG. 2 is a right side view of the utility fixture with the side and rear doors in an open condition.
Figure 3:
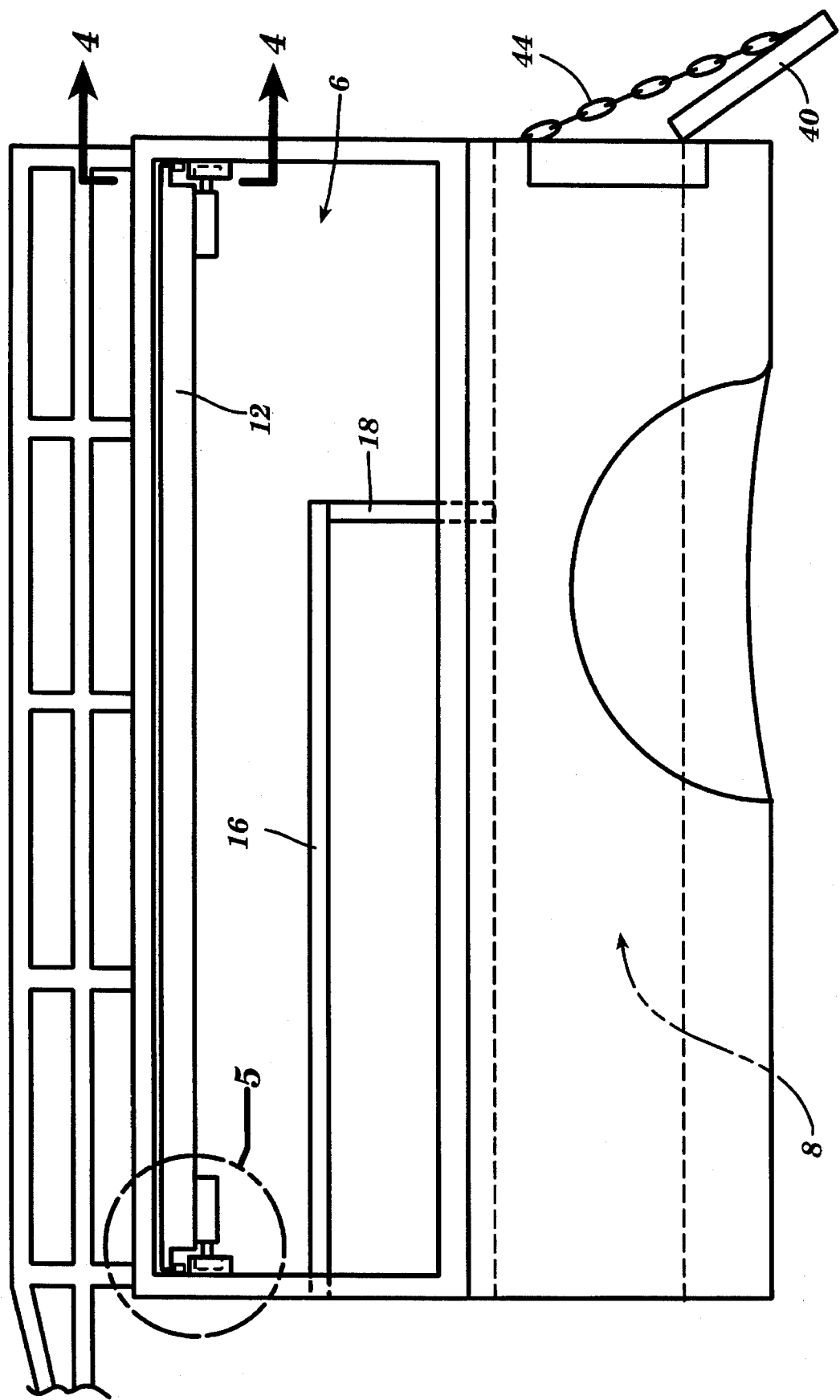
FIG. 3 is a left side view of the utility fixture with the doors in an open condition.
Figure 5:
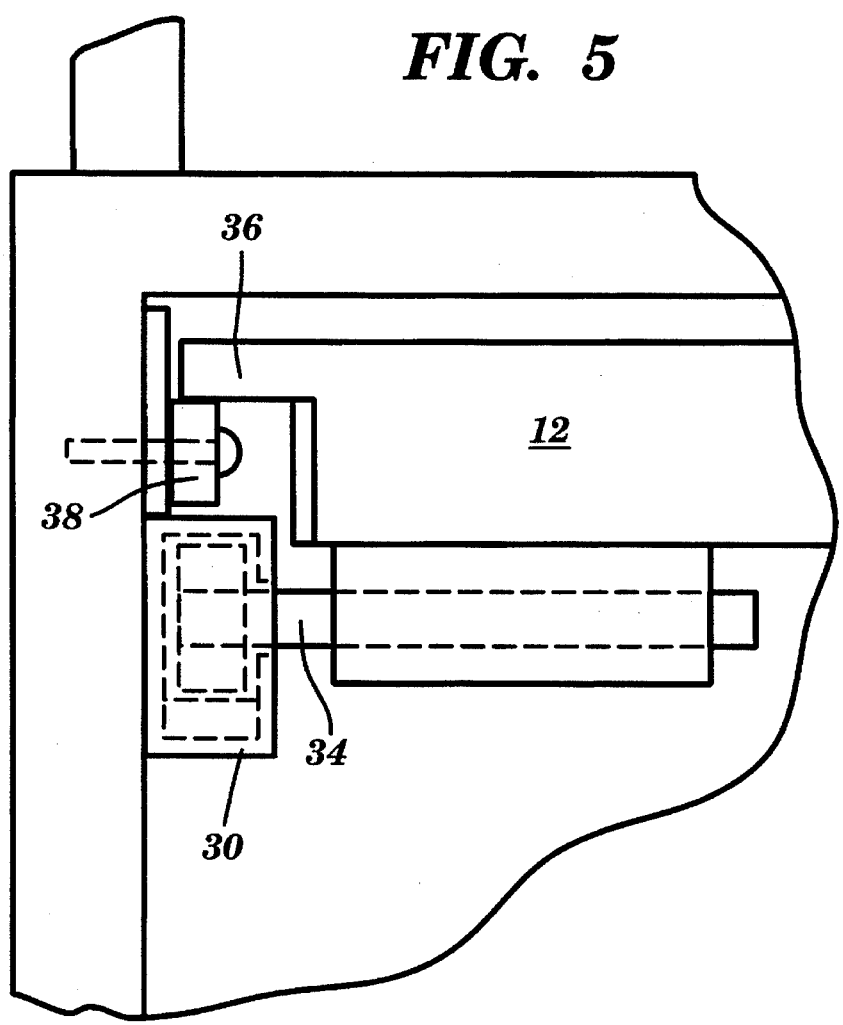
FIG. 5 is a detailed view of detail circle 5 of FIG. 3, of the engagement between an upper compartment door and one of the track members.

A table 20 for a table saw or an aluminum brake is normally stored within each of the compartments 4 and 6. The apparatus includes at least one table 22 that is secured to a framework 24. When the table apparatus is to be deployed, it is placed alongside the exterior of the body (as shown in FIG. 2) and end portions of the framework are inserted within complementary holes 26 in the floor of the associated compartment. This secures the table 20 whereby it can be employed by a user to facilitate use of a tool, such as an aluminum brake or table saw. It should be noted that other equivalent releasable securement methods may be employed for securing the table apparatus. In addition, the apparatus may be secured using a permanently affixed hinge-type fastener that allows the apparatus to be located within the compartment when not in use, and pivoted outwardly to the position shown when needed.

Figure 4:
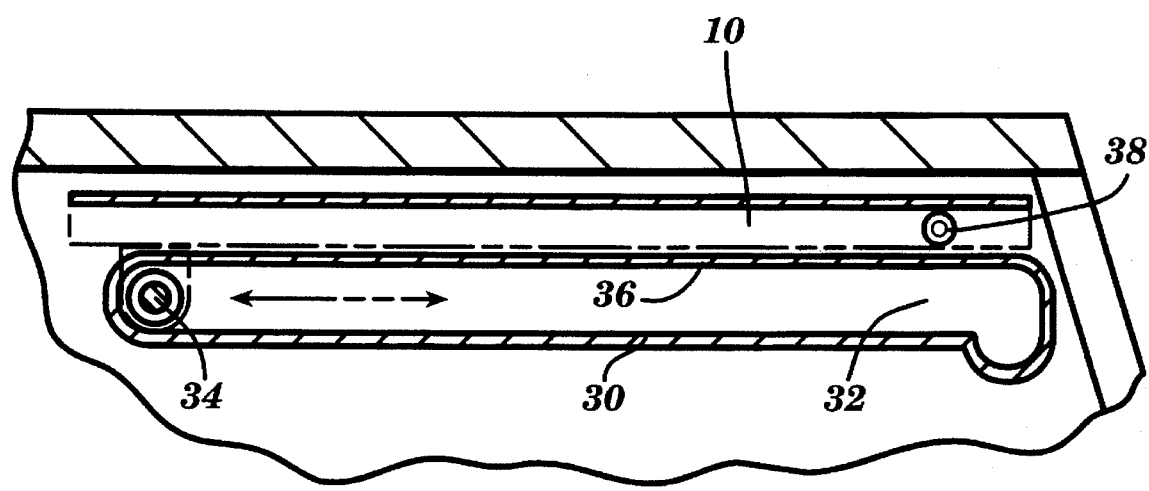
FIG. 4 is a cross-sectional view taken along line 4—4 of FIG. 3, of the track system of the present invention.

FIG. 4 provides a detailed view of a representative portion of the track system used to retain and guide the movement of the doors 10 and 12. The track system makes use of two tracks 30 affixed to opposite sidewalls of each of compartments 4 and 6. As shown, each track includes a central groove 32. The top of each of the doors 10 and 12 includes two pins 34 that extend outwardly from opposite sides of the door. Each of the pins is received within the groove 32 of the associated track 30 and is able to freely slide within said track as indicated by the directional arrow in FIG. 4.

When the door 10 or 12 is to be opened, it is swung outwardly and then lifted up to a horizontal position. The door is then pushed into the top of the compartment. The movement of the door is guided by its pins 34 moving within the associated tracks 30 as indicated by the directional arrow in FIG. 4. As the door is moved inwards, a lip 36 located on each of the two outer side edges of the door rides on top of a round roller 38 located just above the associated track 30 to thereby further support and guide the door. When the door is in its fully open position, it is completely received within the top of the compartment and supported by the pins 34 within the tracks 30 and the lips 36 resting atop the rollers 38.

The bottom compartment 8 of the body underlies both of the upper compartments 4 and 6. Access to the bottom compartment is provided by a door 40 that is attached to the rear of the body using hinges 42. The door is shown with optional support chains 44 that allow the door to swing downward to a horizontal position to facilitate loading, much in the same way as the tailgate of a pickup truck or station wagon. Once the door is open, a user can place a long and/or wide item within the compartment. In the preferred embodiment, the bottom compartment has approximate dimensions of five to six feet wide by eight feet long by one to two feet high. Optionally, for smaller widths, side compartments may be constructed with access below doors 10 and 12. The bottom compartment extends the entire length of the body.

It should be noted that by locating the compartments on two different levels of the body, the body may be used to store a great quantity of items of various sizes. The large bottom compartment provides a user with an unrestricted long and wide area that is only found in vehicles that have a single storage area such as a pickup truck or enclosed van or wagon. The upper, side-located compartments provide ready access to their stored contents without limiting the storage capability of the bottom compartment. This orientation of compartments also allows the doors of the upper compartments to be received within the utility body to thereby overcome the access and obstruction problems found in prior art utility fixture body doors.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A utility fixture for a truck, said utility fixture comprising:

an elongated hollow body adapted to overlie a rear portion of a chassis of the truck, said elongated hollow body having a top portion and a bottom portion;

a first compartment located within said top portion of said elongated hollow body;

a first door located on a side portion of said top portion of said elongated hollow body to provide access to said first compartment, said first door having first and second edges, each edge having a pin member extending therefrom and adapted to fit within a track member affixed to said elongated hollow body within said first compartment, wherein said pin members guide said first door along said track members and said first door is received within said first compartment into an open position, each edge further having an outwardly extending lip located proximate a respective said pin member, each of said outwardly extending lips being adapted to slide atop a roller affixed to said elongated hollow body proximate a respective said track member, wherein each of said outwardly extending lips and a respective said roller guide said first door into said first compartment;

a second compartment located within said bottom portion of said elongated hollow body, said second compartment underlying said first compartment and having substantially the same length and width dimensions of said elongated hollow body; and a second door located on a rear portion of said bottom portion of said elongated hollow body to provide access to said second compartment.

2. The utility fixture of claim 1 further comprising:

a third compartment, located within the top portion of the elongated hollow body; and a third door, for access to said third compartment, located on the top portion of said elongated hollow body on an opposite side of the elongated hollow body relative to the first door, said third door having first and second edges, each edge having a third pin member adapted to fit within a third track member affixed to said elongated hollow body within said third compartment, wherein said third pin members thereof guide said third door along a respective said third track member and said third door is received within said third compartment, each of said first and second edges of said third door further having an outwardly extending lip located proximate a respective said third pin member, each of said outwardly extending lips of said first and second edges of said third door being adapted to slide atop a third roller affixed to said elongated hollow body proximate a respective said third track member affixed to said elongated hollow body within said third compartment, wherein each of said outwardly extending lips of said third door and a respective said third roller guide said third door into said third compartment.

3. A vehicle having multiple storage compartments, said vehicle comprising:

a truck having a chassis; and a utility fixture mounted onto said chassis, said utility fixture comprising:

an elongated hollow body adapted to overlie a rear portion of said chassis, said elongated hollow body having a top portion and a bottom portion;

first and second compartments located within the top portion of the elongated hollow body, wherein each of said compartments is located on opposite sides of the elongated hollow body;

a first door located on a side portion of said top portion of said elongated hollow body to provide access to said first compartment, said first door having first and second edges, each edge having a pin member extending therefrom and adapted to fit within a track member affixed to said elongated hollow body, wherein said pin members guide said first door along said track members and said first door is received within said first compartment into an open position, each edge further having an outwardly extending lip located proximate a respective said pin member, each of said outwardly extending lips being adapted to slide atop a roller affixed to said elongated hollow body proximate a respective said track member, wherein each of said outwardly extending lip and a respective said roller guide said first door into said first compartment;

a second door located on said top portion of said elongated hollow body to provide access to said second compartment, said second door having first and second edges, each of said first and second edge of said second door having a second pin member adapted to fit within a second track member affixed to said elongated hollow body, wherein each said second pin member guides said second door along a respective said second track member and said second door is received within said second compartment, each of said first and second edges of said second door further having an outwardly extending lip located proximate a respective said second pin member, each said outwardly extending lip of said second door being adapted to slide atop a second roller affixed to said elongated hollow body proximate a respective said second track member, wherein each said outwardly extending lip and a respective, said second roller guide said second door into said second compartment;

a third compartment located within the bottom portion of the elongated hollow body, said third compartment underlying and separated from both of said first and second compartments and having substantially the same length and width dimensions as said elongated hollow body; and a third door located on a rear portion of said bottom portion of said elongated hollow body to provide access to said third compartment.

* * * * *